Sept. 15, 1964     J. F. NAPPY     3,148,584
VACUUM FRAME

Filed Aug. 17, 1961     5 Sheets-Sheet 1

INVENTOR.
JOHN F. NAPPY
BY
his ATTORNEYS

Sept. 15, 1964

J. F. NAPPY 3,148,584

VACUUM FRAME

Filed Aug. 17, 1961

INVENTOR.
JOHN F. NAPPY

BY
Brumbaugh, Free Graves & Donohue his ATTORNEYS

Sept. 15, 1964  J. F. NAPPY  3,148,584
VACUUM FRAME

Filed Aug. 17, 1961  5 Sheets-Sheet 3

INVENTOR.
JOHN F. NAPPY
BY
his ATTORNEYS

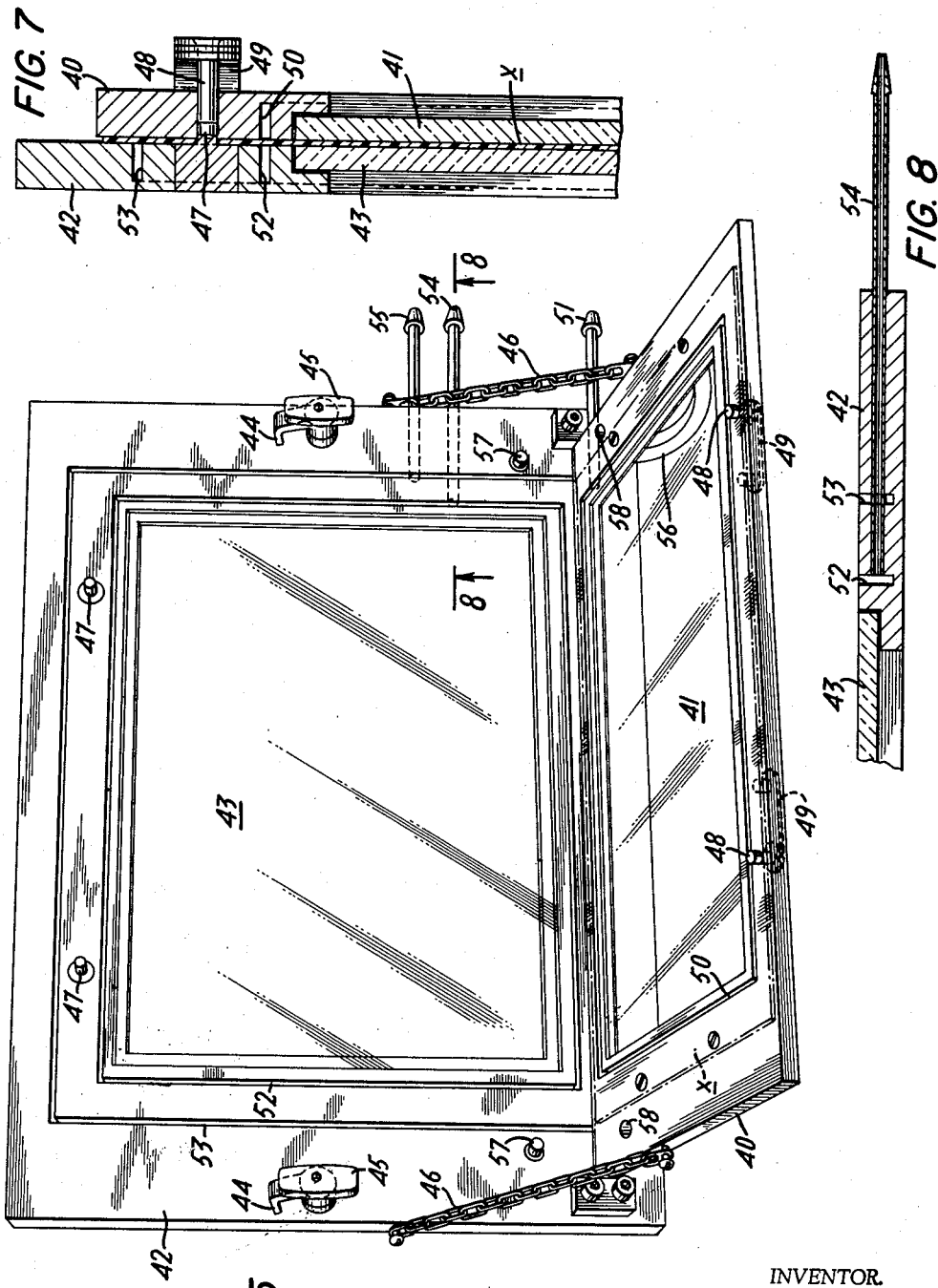

Sept. 15, 1964   J. F. NAPPY   3,148,584
VACUUM FRAME

Filed Aug. 17, 1961   5 Sheets-Sheet 5

INVENTOR.
JOHN F. NAPPY
BY
his ATTORNEYS

United States Patent Office 3,148,584
Patented Sept. 15, 1964

3,148,584
VACUUM FRAME
John F. Nappy, Malverne, N.Y., assignor to Publication Corporation, New York, N.Y., a corporation of New York
Filed Aug. 17, 1961, Ser. No. 132,054
12 Claims. (Cl. 88—24)

This invention relates to photographic vacuum frames and, more particularly, to an improved photographic vacuum frame which permits more effective registration of photographic sheets, films and masks (hereinafter more generally referred to as "film") and in which it is possible to transfer a photographic film from one side of the frame to the other in exact register.

The photographic vacuum frame of the present invention provides means for drawing a vacuum against either or both sides of the frame to permit a punched film to be transferred from one side of the frame to the other in exact register. Toward this end, the vacuum frame also provides means engageable with a film therein for maintaining the film in a predetermined position of registration. With the film held to one side of the vacuum frame and the frame closed, the film is transferred to the opposite side of the vacuum frame by pulling a vacuum on the side to which the film is to be transferred and releasing the vacuum on the side from which the film is to be transferred. After this transfer has been completed, the frame can be opened and another film located in registered position within the frame against the side from which the film has been transferred.

A feature of the preferred form of photographic vacuum frame of the present invention is that it incorporates a punching mechanism which can be used for simultaneous punching of the photographic films within the closed vacuum frame. This simultaneous punching of the photographic films insures that after they are removed from the vacuum frame they can be handled together or separately and brought back together again in the same or in a different vacuum frame with the same or other punched films in the desired registration.

For a more complete understanding of the present invention, reference can be made to the detailed description which follows, and to the accompanying drawings in which:

FIGURE 4 is a fragmentary cross-sectional view taken along the line 4—4 of FIGURE 3 looking in the direction of the arrows;

FIGURE 5 is a perspective view of an alternative form of the photographic vacuum frame shown in open position;

FIGURE 7 is a fragmentary cross-sectional view taken along the line 7—7 of FIGURE 6 looking in the direction of the arrows; and FIGURE 8 is a fragmentary cross-sectional view taken along the line 8—8 of FIGURE 5 looking in the direction of the arrows.

Figure 1:
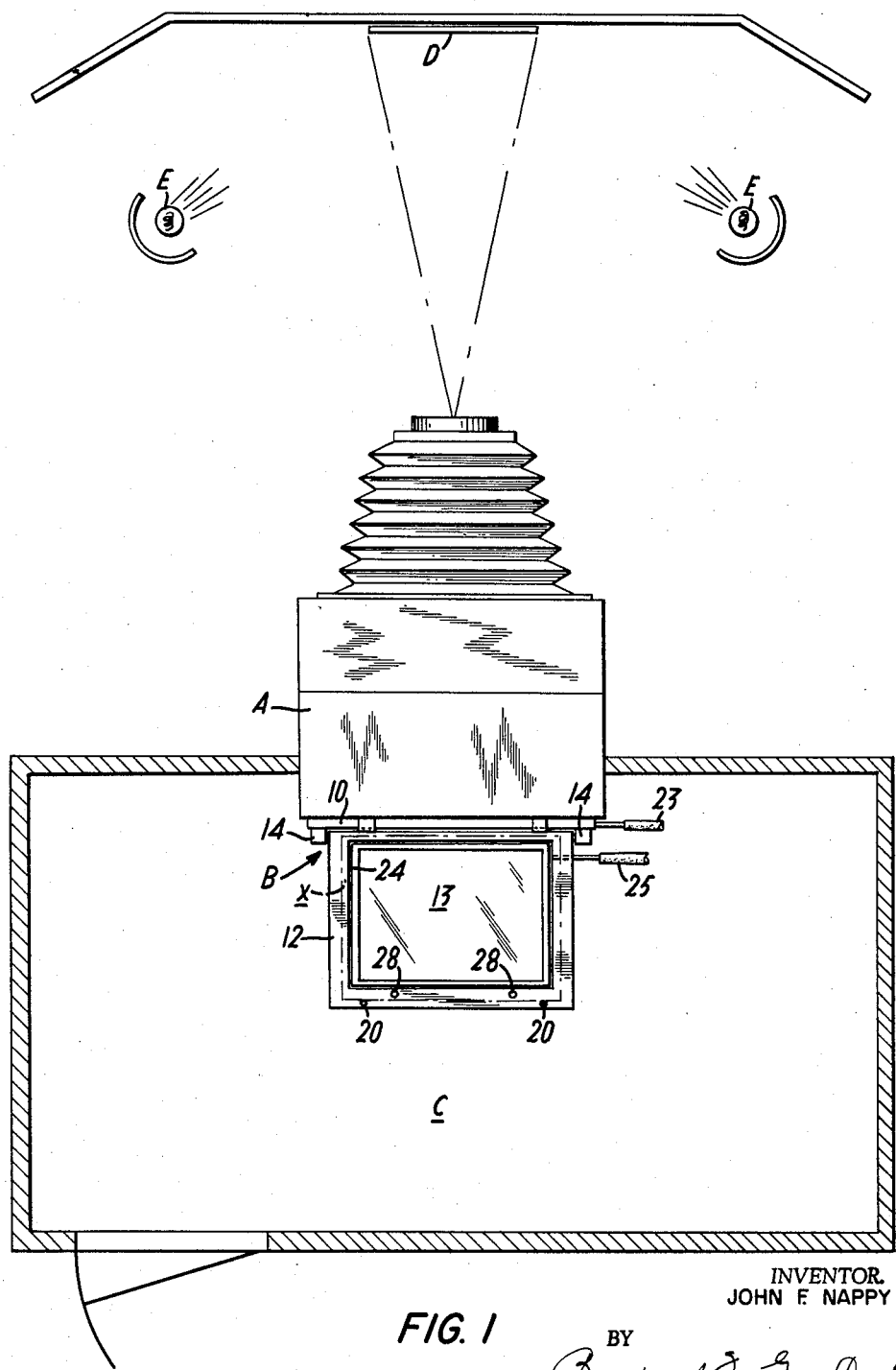
FIGURE 1 is a plan view, showing a camera equipped with the vacuum frame of the present invention.

Referring to FIGURE 1 of the drawings, a camera A is shown equipped with the vacuum frame B of the present invention. The film to be exposed is placed in the vacuum frame along with any mask to be used by an operator within a dark room C, and the original D to be reproduced is set up in front of the camera and lighted by lamps E. The photographic set-up shown in FIGURE 1 is not part of the invention, and it is shown only to illustrate one of many possible applications of the vacuum frame of the present invention.

Figure 2:
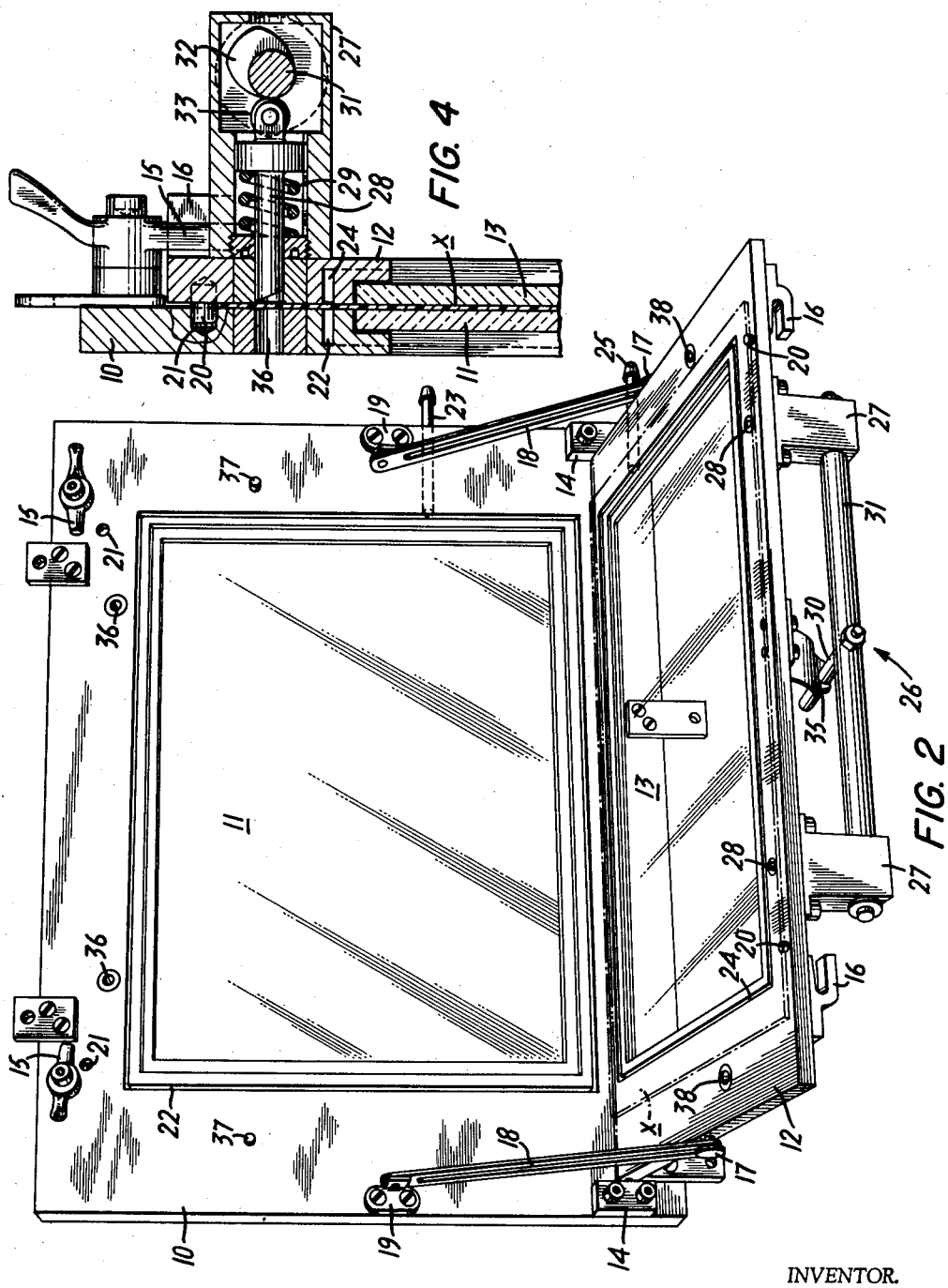
FIGURE 2 is a perspective view of the photographic vacuum frame of the present invention shown in open position.
Figure 3:
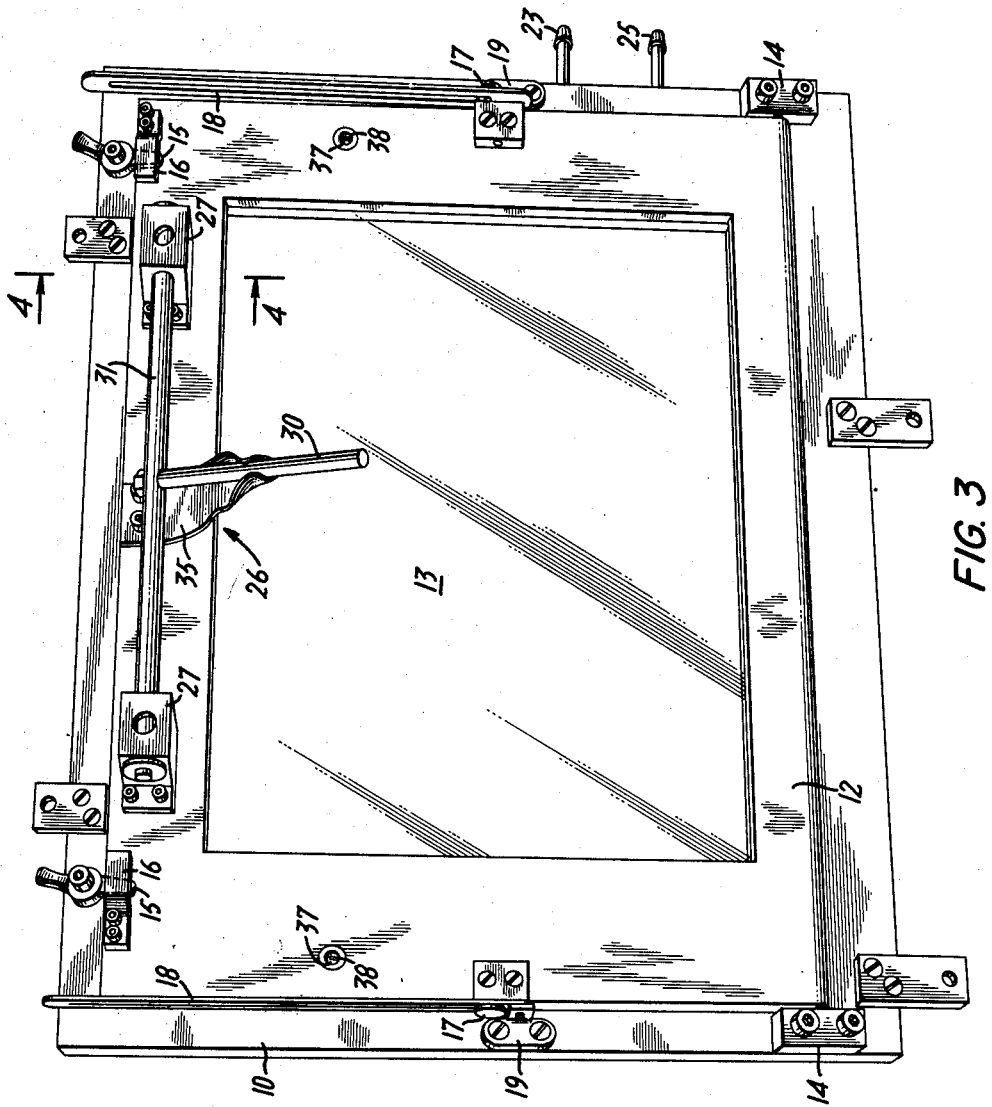
FIGURE 3 is a view similar to FIGURE 1, but showing the vacuum frame in closed position.

Turning now to a description of the vacuum frame illustrated in FIGURES 2 to 4 of the drawings, it includes a stationary frame 10 having a central window 11 and a pivotal frame 12 having a central window 13 and connected by hinges 14 to the stationary frame 10. The stationary frame 10 carries two locking clamps 15 which, when the hinged frame is in closed position as shown in FIGURE 3, enter into the open-ended slots of the member 16 carried by the outer surface of the hinged frame.

The side edges of the pivotal frame are equipped with pins 17 which travel within the relatively long slots of links 18, and the pins have enlarged heads to keep them in engagement with the slots of the links. The upper ends of the links are pivotally connected to anchoring elements 19 which are attached to the stationary frame beyond the side edges of the hinged frame so as not to interfere with the movement of the hinged frame toward closed position. The slots of the pivotal links 18 limit the movement of the hinged frame 12 from closed to open position and support the open hinged frame in a substantially horizontal position, as shown in FIGURE 2, to facilitate placing the photographic film or films on the hinged frame in open position.

The hinged frame 12 carries a pair of spaced-apart film-registering pins 20 on the inner face thereof near the free end of the frame. These pins 20 are aligned with a pair of holes 21 in the inner face of the stationary frame 10 so that the pins are received in the holes when the hinged frame is moved to closed position, as shown in FIGURE 4. When the hinged frame 12 is in the open position shown in FIGURE 2, a photographic film x can be placed on the frame 12 in registered position with one edge in contact with the registration pins 20. The film can be retained in that position by suction while the frame is closed.

Both frames 10 and 12 have rectangular suction channels which surround the windows of the respective frames. The channel 22 which surrounds the window 11 is in communication with a source of vacuum pressure through a conduit 23. Similarly, the channel 24 which surrounds the window 14 of the pivotal frame is in communication with a vacuum pressure through a conduit 25. These channels make it possible for a photographic film to be held flatly and firmly without air pockets in contact with the respective window. Although not shown in the drawings, each of the suction lines 23 and 25 is provided with separate control valves so that the suction to each of the channels 22 and 24 can be separately controlled.

The outer side of the pivotal frame 12 is equipped with a punch mechanism generally designated 26. This punch mechanism includes two spaced-apart housings 27, each containing a movable punch element 28 (see FIGURE 4). The punch elements 28 cooperate with dies in the inner surface of the frame 10. Each punch element is normally urged to inoperative position by the force exerted by a compressed spring 29 acting against the enlarged end of the punch element. The punches can be operated simultaneously by the actuation of a handle 30 attached to a rotatable shaft 31 extending between the housings 27. Both ends of the shaft 31 carry cams 32 which actuate the punch elements through cam followers 33 connected to the respective punch elements 28. The actuation of the punch handle 30 is resisted by a leaf spring 35 affixed at one end to the outer surface of the pivotal frame and the other end partially encircling the handle 30 so as to grip it snugly. The leaf spring 35, therefore, cooperates with the compressed springs 29 to maintain the punch elements and the actuating handle in inoperative position and to offer resistance to the actuation of the handle to operate the punching mechanism.

The frame 10 is also equipped with a pair of pins 37 which engage holes 38 in the hinged frame 12, thereby insuring that the frames 10 and 12 are properly oriented with respect to each other when the vacuum frame is closed.

In the use of the photographic vacuum frame described above in connection with FIGURES 2 to 4, a photographic film $x$ (e.g., a partially transparent and partially opaque masking film) can be placed on the upper surface of the hinged frame 12 in open position with the edge of the film in contact with the film-registering pins 20. The film can be drawn in firm contact with and held against the frame 12 by opening the valve in the suction line 25. The frame 12 can then be closed and, if it is desired to transfer the film from the frame 12 to the frame 10, the control valve in the suction line 23 can be opened and the control valve in the suction line 25 closed. This transfer can be accomplished while the punch mechanism is actuated so that not only will the film be provided with holes useful in the further handling of the film and registration of the film with other punched film, but the transfer of the film from the frame 12 to frame 10 will take place while the punch elements are still in engagement with the holes, thus preventing any shifting of the film within the vacuum frame during the transfer. It is apparent that with the film $x$ supported against the frame 10 by suction, the frame 12 can now be again opened, if desired, and another film (e.g., the film to be exposed) can be placed in contact with the frame 12 held thereto by suction established by opening the valve in the suction line 25. When the frame 12 is closed, the second film can also be punched so that thereafter the two films can be handled in the same or a different vacuum frame in perfect register.

Figure 6:
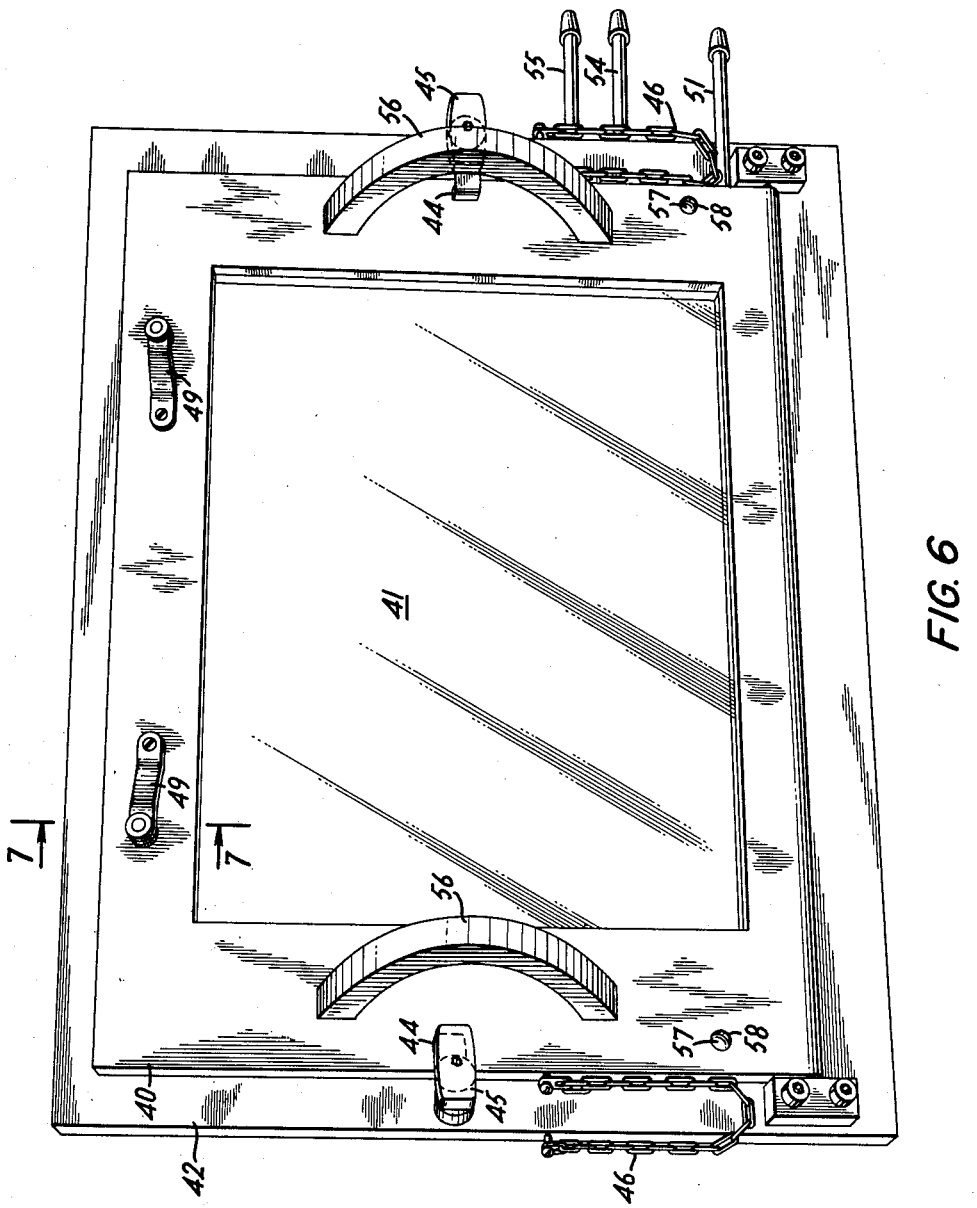
FIGURE 6 is a view of the vacuum frame shown in FIGURE 5 in closed position.

Another version of the vacuum frame of the present invention, this one for handling pre-punched film, is shown in FIGURES 5 through 8 of the drawings. In this version, a pivotal frame 40 having a central window 41 is hinged at its lower edge to a stationary frame 42 having a central window 43. The stationary frame carries a pair of pivotal, resilient clamps 44 which are laterally offset from the side edges of the pivotal frame in closed position, but which can be rotated by turning the handles 45 to bring the resilient clamps 44 into locking engagement with the outer side of the pivotal frame in closed position, as shown in FIGURE 6. The pivotal frame 40 is connected by chains 46 to the stationary frame to limit the pivotal movement of the frame 40 away from the frame 42 and to support the frame 40 in open position in a substantially horizontal plane.

The stationary frame 42 is provided with a pair of pins 47 which are in alignment with the pins 48 carried by the pivotal frame 40. The pins 48 are carried by leaf springs 49 affixed to the outer surface of the pivotal frame 40, and these leaf springs 49 normally maintain the inner ends of the pins 48 projecting inwardly of the inner surface of the pivotal frame 40. Thus, when the frame is open, as shown in FIGURE 5, a pre-punched film can be properly positioned against the inner surface of the frame 42 by placing the punched holes on the pins 47 or film can be placed in contact with the inner surface of the frame 40 by placing the punched holes thereof on the pins 48. In either case, the film can be held to the respective frame by suction. When the vacuum frame is closed, as shown in FIGURE 7, the pins 47 will engage the ends of the pins 48 and the springs 49 will permit the pins 48 to retract until the pins 47 enter the holes which accommodate the pins 48.

The pivotal frame 40, as in the embodiment shown in FIGURES 2 through 4, includes a rectangular channel 50 which surrounds the window 41 and is in communication with a source of vacuum pressure through a conduit 51. The frame 42 is provided with a pair of rectangular channels, namely, an inner channel 52 which surrounds the window 43 and an outer channel 53 which extends outside the pins 47. The inner channel 52 is connected with a source of vacuum pressure through a conduit 54 and the outer channel through a conduit 55. The conduits 54 and 55 have separate control valves so that either or both can be connected to the vacuum source.

The outer surface of the frame 40 is equipped with a pair of handles 56 to facilitate opening and closing the vacuum frame. Also, the frame 42 is provided with a pair of pins 57 outside the area bounded by the channel 53 which pins are aligned with and received by holes 58 in the hinged frame 40 when the latter is closed.

It will be apparent to those skilled in the art that the vacuum frame of the present invention will be especially useful in photographic negative masking, silverback masking and in multi-color work, where exact registration of the film is especially important. It will also be apparent that the vacuum frame of the present invention will result in substantial savings of time and increased efficiency over photographic frames heretofore in use.

The invention has been shown in preferred forms by way of example only, and many variations and modifications can be made therein without departing from the spirit of the invention. The invention, therefore, is not to be limited to any specified form or embodiment except insofar as such limitations are expressly set forth in the claims.

I claim:

1. A photographic vacuum frame comprising a pair of frames which are closed when making photographic reproductions and separable to permit a film to be interposed between them before the frames are closed, registration means carried by at least one of said frames, controlled suction means for holding a film against one of the frames, and separately controlled suction means for holding a film against the other of said frames.

2. A photographic vacuum frame comprising a pair of frames which are closed when making photographic reproductions and separable to permit a film to be interposed between them before the frames are closed, means defining a channel in each frame, separately controlled means for establishing communication between the channel-defining means of each frame and a vacuum source to hold a film against either or both frames, and means engageable with registration holes in a film interposed between the frames.

3. A photographic vacuum frame as set forth in claim 2 in which said means engageable with registration holes in the film includes a pair of punching elements.

4. A photographic vacuum frame as set forth in claim 2 in which said means engageable with registration holes in the film includes a pair of registration pins.

5. A method of using the vacuum frame defined in claim 2 including the steps of placing a film against one frame in registered position, drawing a vacuum from the channel-defining means of that frame to hold the film thereto, closing the vacuum frame, and drawing a vacuum from the channel-defining means of the other frame while cutting off the connection between the vacuum source and the frame against which the film was initially registered, thereby transferring the film from one frame to the other.

6. A method as set forth in claim 5 including transferring the film from one frame to the other while holes in the film are in engagement with said engageable means.

7. A photographic vacuum frame comprising a pair of frames which are closed when making photographic reproductions and separable to permit a film to be interposed between them before the frames are closed, suction means for holding a film against one of the frames, separately controlled suction means for holding a film against the other of said frames and a film-punching mechanism carried by one of the frames for punching registration holes in a film interposed between the frames.

8. A photographic vacuum frame comprising a pair of frames which are closed when making photographic reproductions and separable to permit a punched photographic film to be introduced between them before the frames are closed, suction means for holding a film against one of the frames, separately controlled suction means for holding a film against the other of said frames, registration pins carried by at least one of the frames for receiving thereon a punched photographic film, and means defining recesses in the other frame for receiving the registration pins when the vacuum frame is closed.

9. A photographic vacuum frame as set forth in claim 8 including registration means carried by one frame for registering an edge of a photographic film interposed between the frames and means defining recesses in the other frame for receiving the registration pins when the vacuum frame is closed.

10. A photographic vacuum frame as set forth in claim 8 including retractable registration pins carried by the other frame in the recesses, said retractable registration pins receiving thereon a punched photographic film in their projecting positions, and resilient means urging the retractable registration pins to their projected positions to receive a punched film.

11. A photographic vacuum frame comprising a pair of hinged frames separable to permit a film to be interposed between them, locking means for locking the frames together, a window in each frame, a recessed channel in each frame substantially surrounding the respective window, a conduit establishing communication between each channel and a vacuum source, a valve in each conduit providing a separate control for establishing communication between each channel and the vacuum source, and means engageable with holes in a film interposed between the frames.

12. A photographic vacuum frame as set forth in claim 11 including means for mounting one of the frames in vertical position and means for limiting the pivotal movement of the hinged frame to a substantially horizontal position.

References Cited in the file of this patent

UNITED STATES PATENTS

| | | |
|---|---|---|
| 612,550 | Schwarz | Oct. 18, 1898 |
| 2,614,469 | Hillmer et al. | Oct. 21, 1952 |
| 2,836,099 | Weishaupt | May 27, 1958 |
| 2,974,579 | Echelson et al. | Mar. 14, 1961 |

OTHER REFERENCES

German application, 1,066,863, printed Oct. 8, 1959.